July 1, 1941.  E. E. BOWERS ET AL  2,247,474
ROTARY ENGINE
Filed June 26, 1940   5 Sheets-Sheet 3

INVENTORS
EARL E. BOWERS AND
CHARLES M. TUMEY,
BY Minturn Minturn,
ATTORNEYS

July 1, 1941.  E. E. BOWERS ET AL  2,247,474
ROTARY ENGINE
Filed June 26, 1940  5 Sheets-Sheet 4

INVENTORS
EARL E. BOWERS AND
CHARLES M. TUMEY,
By Minturn & Minturn
ATTORNEYS

Patented July 1, 1941

2,247,474

UNITED STATES PATENT OFFICE 2,247,474

ROTARY ENGINE

Earl E. Bowers, Lebanon, and Charles M. Tumey, Indianapolis, Ind.

Application June 26, 1940, Serial No. 342,456

4 Claims. (Cl. 121—70)

This invention relates to a rotary engine of the positive displacement type and has for a primary object the formation of a structure that will have a high thermal efficiency, be exceedingly compact, and have an exceedingly low mechanical friction loss throughout the various moving parts.

An important feature of the invention is the provision of a tortuous, antennate steam travel wherein the applied pressure in tending to leak past rotary members meets a residual or counterflowing pressure, all without frictional packing or glands.

A still further important object of the invention is to provide a sealed unit having but a single moving member (drive shaft) extending therefrom.

Figure 1:
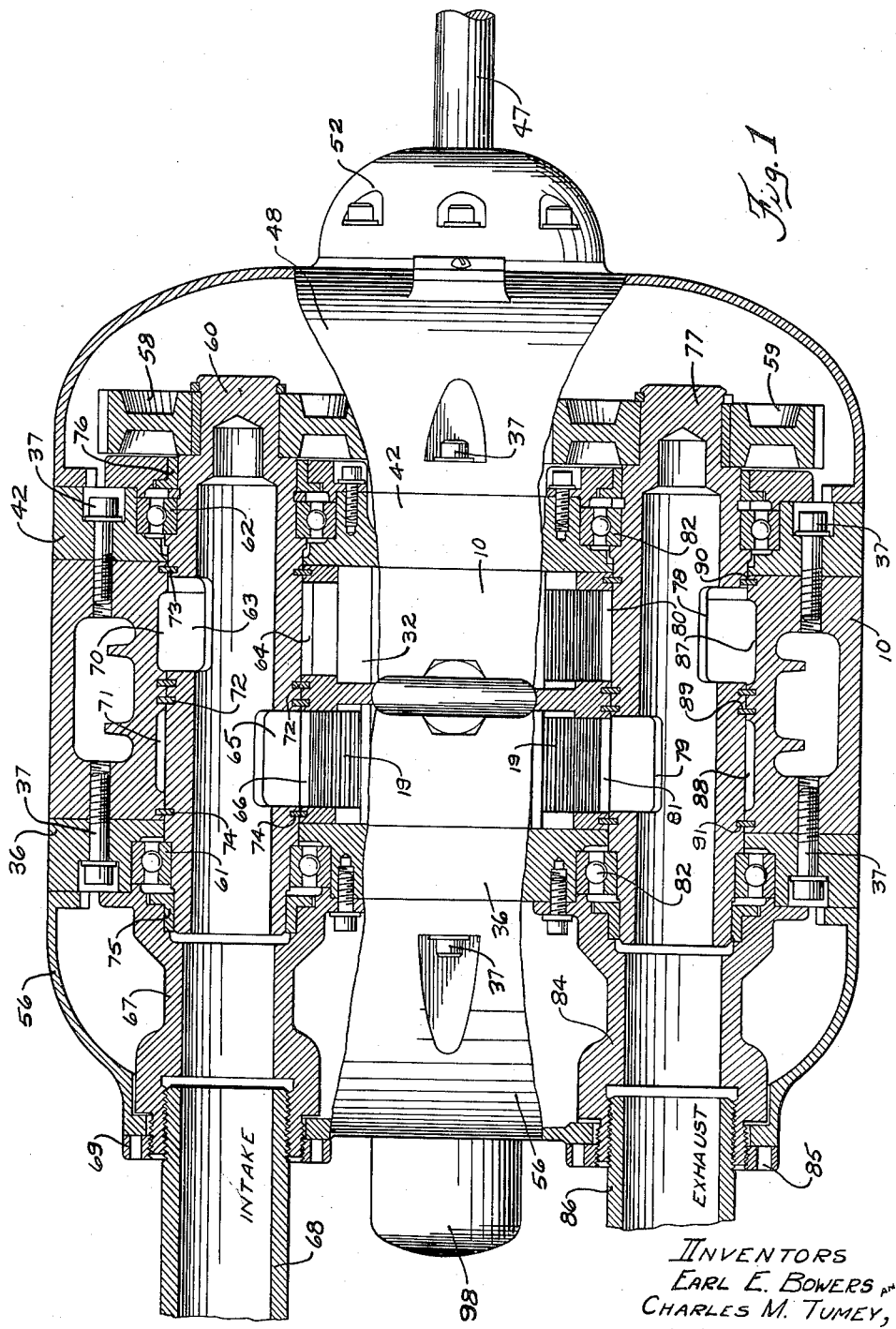
Figure 2:
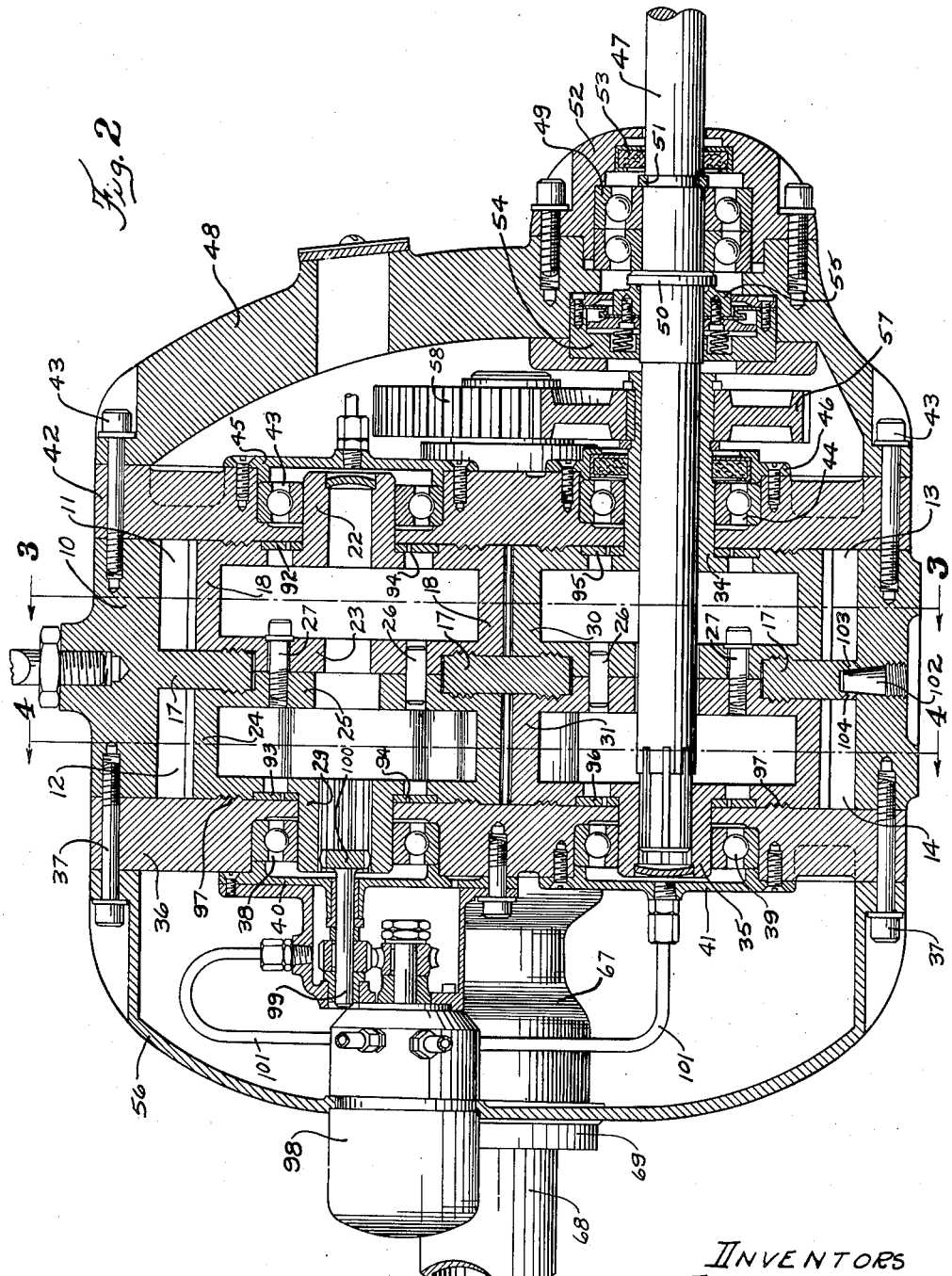
Figure 3:
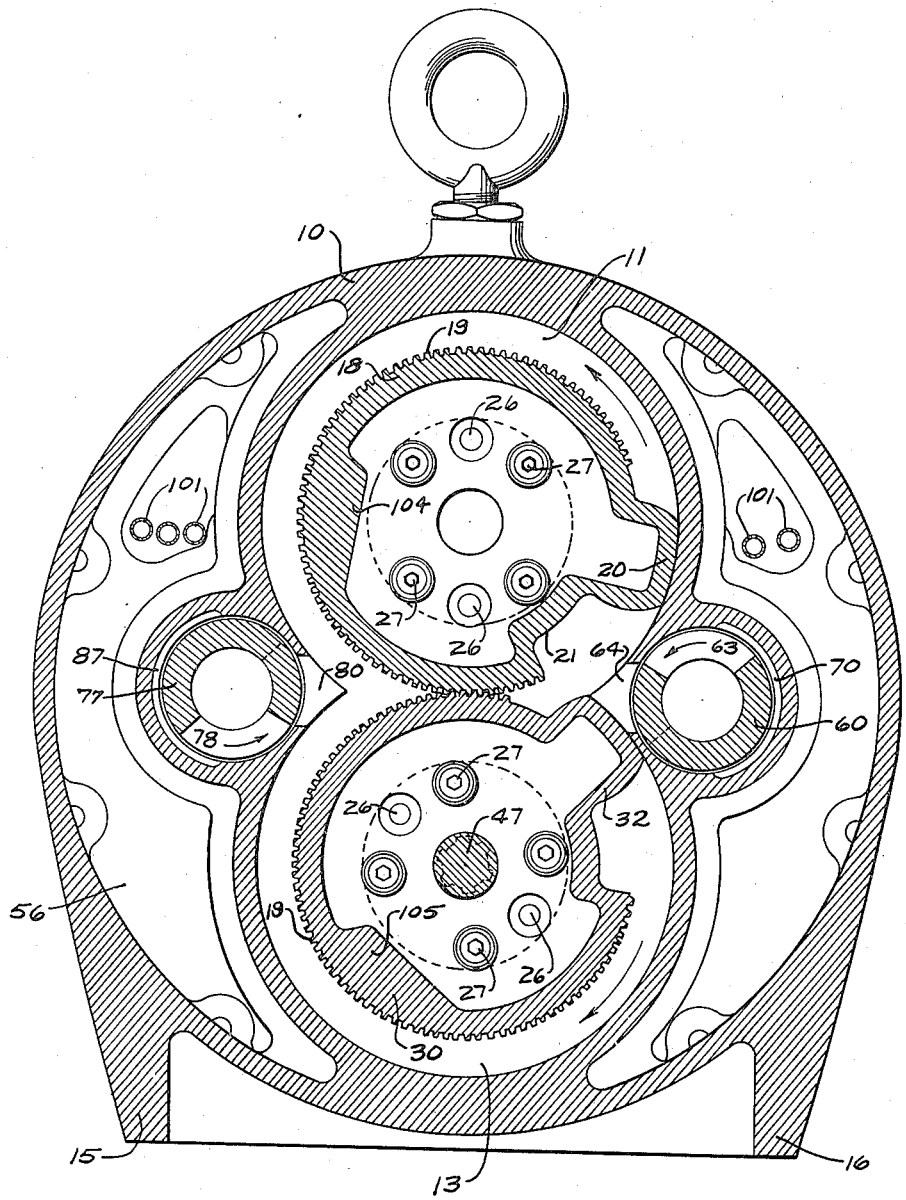
Figure 4:
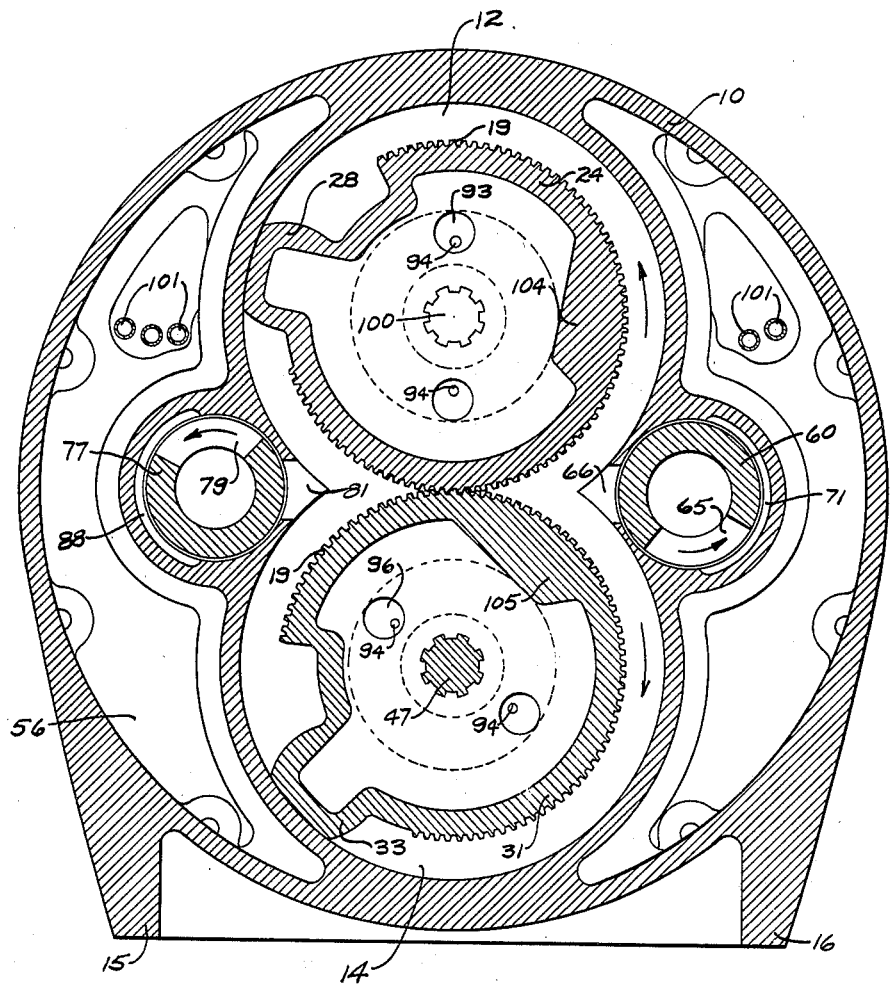
Figure 5:
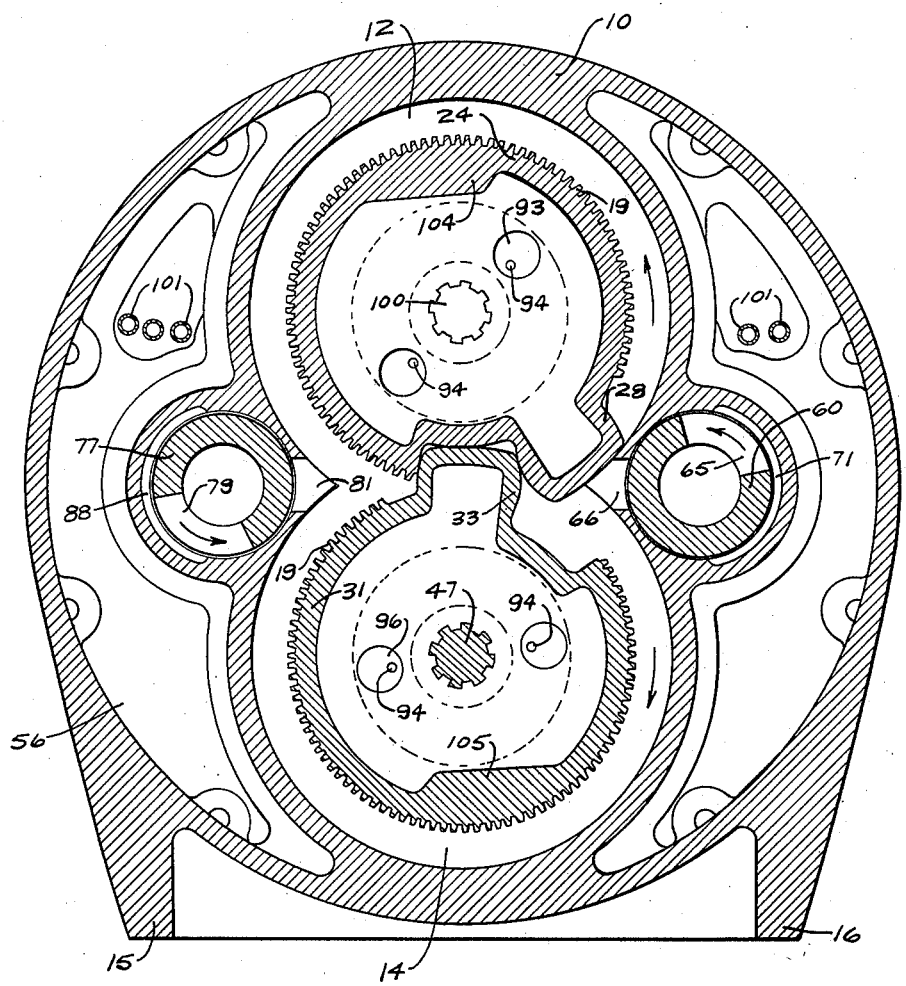

These and many other features and advantages of the invention will become apparent to those versed in the art in the following description of one particular form of the invention as illustrated in the accompanying drawings, in which Fig. 1 is a top plan view of a structure embodying the invention in partial section;

Fig. 2, a central, vertical, longitudinal section;

Fig. 3, a transverse vertical section on the line 3—3 in Fig. 2 with the rotors about to receive steam pressure;

Fig. 4, a like section on the line 4—4 in Fig. 2 with steam pressure cut off after an initial travel of the rotors; and Fig. 5, a section similar to Fig. 3 but with the rotors revolved substantially 320 degrees from the positions shown in Fig. 3.

Like characters of reference indicate like parts throughout the several views in the drawings.

A short externally cylindrical body 10 is formed to have a pair of concentric upper cylinders 11 and 12 and a pair of lower like, concentric cylinders 13 and 14. In order to maintain the cylinders 11 and 12 vertically above the lower cylinders 13 and 14, the body 10 is provided with a pair of feet 15 and 16. The body 10 is provided with a central partition wall 17 serving as the inner ends respectively of the cylinders 11, 12 and 13, 14. This partition 17, Fig. 2, is provided with upper and lower circular openings therethrough concentric with the axes of the cylinders 11, 12 and 13, 14 respectively. The upper and lower pairs of cylinders intersect chordally whereby the corresponding upper and lower cylinder in each pair is normally in open communication one with the other.

A rotor 18, Fig. 3, is formed in the general shape of a hollow cylinder to have gear teeth 19 cut transversely across its periphery around a major portion thereof. A vane or major tooth 20 extends radially from the circumference of the rotor and immediately behind that vane a depressed area 21 is provided, the vane 20 and the area 21 being between the ends of the rotor periphery carrying the teeth 19.

From one side of the rotor 18 extends a trunnion 22 to serve as a bearing support. From the other side of the rotor 18 extends a boss 23 having an external diameter less than that of the opening through the partition 17. This rotor 18 is placed in the cylinder 11 to have this boss 23 extend into the opening through the partition 17 and a like rotor 24 is placed in the adjacent cylinder 12 to have a boss 25 entered into that same partition opening to abut the boss 23 and these two rotors 18 and 24 are secured one to the other by any suitable means, such as the pins 26 and bolts 27. The rotor 24 is substantially a duplicate of the rotor 18, particularly in reference to its peripheral formation, Fig. 4. The rotor 24 has its vane 28 turned and fixed substantially 180 degrees around from the vane 20 of the rotor 18. The rotor 24 carries a trunnion 29 extending from its outer face.

In like manner, rotors 30 and 31 are placed in the cylinders 13 and 14 and these rotors secured one to the other through the opening provided in the partition 17. The rotor 18 is positioned circumferentially in its cylinder in reference to the position of the rotor 30 in the cylinder 13 below to have the minor teeth 19 of each mesh with each other in close driving relation, and to have the recessed area 21 located to receive the vane 32 of the rotor 30 therein in the nature of a gear tooth in driving relation with the vane 20 so that a continuous rotary movement is given one rotor when the other rotor is turned about its own axis irrespective of the difference in teeth about their peripheries. In other words each rotor is in the nature of a mutilated gear but maintaining driving relation one with the other throughout the 360 degrees of travel. The vane 33 of the rotor 31 is located 180 degrees around from the vane 32 of the rotor 30, Fig. 4. Each rotor 30 and 31 carries respectively trunnions 34 and 35.

A cylinder cover plate 36 is brought against the side of the body 10 to form the outer sides of the cylinders 12 and 14. The plate 36 is secured to the body 10 by any suitable means with a steam tight connection, such means being herein shown as bolts 37. The respective trunnions 29 and 35 of the rotors 24 and 31 extend through bores provided in the plate 36 to be carried by the inner races of the respective ball bearings 38 and 39, these bearings being mounted in counterbores entering from the outer side of the plate 36 and having the securing plates 40 and 41.

Likewise on the other side of the body 10 is a cover plate 42 brought against the body 10 and there secured by any suitable means, such as by the bolts 43, in steam tight connection therewith. This plate 42 forms the outer side wall of the cylinders 11 and 13. The rotor trunnions 22 and 34 extend through bores provided in the plate 42 to be carried by the inner races of the ball bearings 43 and 44 mounted in counterbores in the plate 42 and there secured by the plates 45 and 46.

Thus the two upper rotors 18 and 24 are mounted as a unit to turn on the bearings 40 and 43 within their respective cylinders 11 and 12 and as these rotors may turn, the lower rotors 30 and 31 will be turned likewise on their supporting bearings 39 and 44.

The minor toothed periphery of each of these four rotors has a diameter less than that of the cylinders, whose diameters in the present form are identical. This difference in diameters leaves an annular chamber between the walls of each cylinder and its rotor therein. The vane on each rotor has a substantial circumferential length and is in close running fit with the wall of its cylinder. It does not, however, come into actual contact therewith. The widths of each of the four respective rotors are made to be such that they are free from contact with the partition 17 and the enclosing plates 36 and 42.

A drive shaft 47 extends axially with a relatively free sliding fit through the trunnion 34, the rotors 30 and 31, and enters with a suitable driving connection into a bore provided in the trunnion 35 of the rotor 31. In the present form, this connection of the shaft 47 with the trunnion 35 is by a spline fit and the shaft is free to travel longitudinally in respect to this connection and its passage through the rotors and the trunnion 34. It is to be appreciated that this shaft 47 could equally as well be connected with the trunnion 29 of the rotor 24 and extend through the rotor 18. The location of the shaft is a matter of choice between these two connections. A housing cover 48 is connected with a steam tight joint against the plate 42 by the bolts 43. This cover 48 carries a suitable load bearing 49 for the shaft 47, the bearing in the present instance being indicated as a double thrust ball bearing, the inner races of which are located on the shaft 47 between the inner shaft collar 50 and an outer retaining ring 51. In the form herein shown, this bearing 49 is retained in position by means of the bearing cap 52, pulled against the cover 48. An outer felt packing 53 encircles the shaft 47 solely as a means of preventing oil from escaping from the bearing 49. This packing 53 does not to any extent serve as a steam packing.

Fitting into a counterbore from the inner face of the cover 48 is a packing unit 54 which is commercially obtainable for the purpose about to be described and its details per se do not enter into the invention. This packing unit 54 is of the spring pressed bellows type forming a high pressure steam seal through the plate 55 urged against the face of the collar 50, Fig. 2. This packing unit 54 serves to prevent steam leaking longitudinally of the shaft 47 outwardly toward the bearing 49. The shaft 47 is the only externally presented member of the engine that moves.

On the other end of the engine is a housing cover 56 which is carried against the plate 36 with a steam tight connection by means of the bolts 37. Therefore, even if steam may leak from the cylinders 11, 12 and 13, 14 past the faces of the rotors therein and out through or around their respective trunnions into the chambers formed between the plates 36 and 42 and their respective covers 56 and 48, that steam can not escape from the engine, but a pressure may build up in those chambers and this pressure is utilized as will hereinafter appear.

Fixed to the shaft 47 is a timing gear 57. This gear 57 is in constant mesh with the valve gears 58 and 59, Fig. 1. The gear 58 is fixed on the outer end of the intake valve 60, Fig. 1, this valve consisting essentially of a hollow cylindrical member rotatably mounted in a chamber extending through the body 10 with its axis in the plane of intersection of the upper and lower cylinders. The valve 60 is carried by the ball bearings 61 and 62 near its respective ends, these bearings being mounted and secured in the respective cylinder end plates 36 and 42. The valve 60 is provided with a port 63 to register with an opening 64 into the cylinders 11 and 13, and a second port 65 to register with an opening 66 into the chambers 12 and 14.

A stationary fitting 67 is secured against the plate 36 and extends through the cover 56 with a steam tight connection therewith and receives a steam supply pipe 68 in any suitable manner, such as by screw-threads, Fig. 1. As indicated, the outer end of the fitting 67 carries a jam nut 69 screw-threadedly engaging with it externally of the housing cover 56 so that the nut 69 may be drawn against a faced area of the cover 56 to form the seal. The fitting 67 has an internal bore interconnecting the discharge end of the pipe 68 with an opening in the end of the valve 60 so that the steam supply is available at all times within the chamber formed in the valve itself. That portion of the body 10 through which the valve 60 extends carries counterbores 70 and 71 substantially 180 degrees therearound opposite the respective openings 64 and 66 and the valve 60 is fitted externally with one or more rings 72, herein shown as two in number, in slots therearound so that these rings may spring into corresponding slots substantially half their thickness provided in the body 10 between these two counterbores 70 and 71, Fig. 1, so as to prevent steam from traveling longitudinally of the valve along its external face. Preferably like rings 73 and 74 encircle the valve 60 to engage in receiving slots in the body 10 outside of these bores 70 and 71, so as to prevent steam from escaping therefrom toward the bearings 61 and 62. Bronze rings 75 and 76 are fixed in position outside of the bearings 61 and 62 to engage with a running fit about the valve 60 so as to prevent any appreciable amount of steam from leaking from the ends of the valves externally thereof to these same bearings. It is to be noted that all of these rings 72, 73 and 74 spring into the slots provided in the body 10 and remain stationary in respect to turning of the valve 60, thereby forming in effect a labyrinth seal around which steam may follow only in a tortuous path. The valve 60 is turned at the same speed as that of the shaft 47, the ratio between the gears 58 and 57 being one to one.

The gear 59 is fixed on the outer end of an exhaust valve 77 which is substantially a counterpart of the valve 60, being a hollow cylindrical member having ports 78 and 79 to register respectively upon turning with openings 80 and 81 between the cylinders 11, 13 and 12, 14. The valve 77 is mounted on the ball bearings 82 and 83 and has a discharge end opening axially into a fitting 84 which is a duplicate of the fitting 67 and has its outer end interconnected with the housing 56 with a steam tight joint formed by the jam nut 85. The steam exhaust pipe 86 is fixed in position by screw-threadedly entering the fitting 84. The exhaust valve 77 has its chamber in the body 10 relieved by the counterbores 87 and 88 extending substantially 180 degrees around the chamber opposite the respective cylinder openings 80 and 81. Travel of steam longitudinally of the valve 77 between the counterbores and the ball bearings carrying the valve is prevented by means of the encircling rings 89 and 90, 91, these rings becoming fixed in position within grooves provided in the body member 10. In reference to these rings about the exhaust valve and also about the intake valve, it is to be pointed out that these rings are not fitted tightly but with a free running fit in respect to the valves themselves. The purpose of these rings is not to make a metal to metal contact but to provide a tortuous passageway thereacross to retard and reduce the flow of steam to substantially nothing.

Referring again to the rotors 18, 24 secured together as a unit, openings are provided through the bosses 23 and 25 to permit a free passageway between the interior cavities within the rotors. Bearing washers 92 and 93 surround the trunnions 22 and 29 respectively and are carried in counterbores on the side faces of the rotors 18 and 24 to bear with a running fit against the plates 42 and 36. Each of these washers 92 and 93 is provided with a plurality of holes 94 drilled therethrough and the rotors behind these washers are provided with openings registering with these holes so that there is a communication from the outer side of the washers directly with the cavities within the rotors. In like manner washers 95 and 96 are provided on the trunnions 34 and 35. These washers in all instances are preferably made out of some suitable bearing material, such as bronze, to bear against steel or cast iron as the case may be, and serve as thrust washers. Their diameters are limited as indicated in the drawings, Fig. 2, so that when any one or more washers are under a thrust load, their actual bearing area against the cover plate is relatively small and confined closely to the axis of rotation whereby frictional drag is reduced to a minimum.

Where the engine is to be built in a relatively small unit, as above indicated, the sides of all four rotors are provided with a plurality of concentric ribs 97 which may take any form, either square, round, or as indicated in the present showing, triangular shape in section. The partition 17 and the plates 36 and 42 are each provided with a series of complementary ribs so that a tortuous passage is set up for any steam tending to escape from the annular chambers about the rotors along the sides of the rotors toward the axes thereof, the interfitting ribs serving as labyrinth packing as indicated in the copending application of Charles M. Lumey for U. S. Letters Patent, Serial No. 180,522, filed December 18, 1937, now matured as Patent No. 2,211,447. However, in larger units, these ribs 97 are dispensed with and any steam flowing between the sides of the rotors and the cover plates reaches the thrust washers and may discharge into the cavities provided within the rotors. In fact any steam getting past the ribs 97 in the smaller units will also arrive in these cavities, and in both instances a pressure is built up within the rotors eventually approaching, if not equalling, the steam pressure initially supplied in the annular chambers about the peripheries of the rotors. In other words it is of no serious consequence if there be a slight leakage past the sides of the rotors since the internal pressure built up within the rotors will eventually equal the pressure of the steam tending to travel theretoward and thereby prevent and stop further leakage, the one pressure opposing the other. The same idea prevails in case steam leaks on beyond the trunnions of the respective rotors and escapes through the respective bearings into the chambers outside of the plates 36 and 42 bounded by the covers 48 and 56. Pressure is preferably built up in these chambers from such leakage so as to effectively stop any additional leakage. The unit 54 effectively prevents escape of steam from the chamber between the plate 42 and cover 43 along the shaft 47. Since there are no moving parts through the cover 56, and the intake and outlet steam pipes are sealed against leakage and their passage through the cover, there are no moving parts about which steam may escape from that chamber.

It is necessary, of course, to provide ample lubrication for an engine of this type where all of its moving parts are sealed within a compact housing. Since the various parts are operating in the presence of a pressure induced by the steam employed for operating the rotors, a pump unit 98 commercially obtainable and having a multiple number of outlets is employed. This unit is mounted through the cover 56 with a steam tight connection therewith and is gear driven from a shaft 99 having a pinion 100 carried within the trunnion 29 to engage teeth cut internally thereof. From the pump 98 lead a plurality of oil lines 101 to the various bearings. This oil is supplied under pressure so that it will flow into the various bearings and cavities to which the oil lines lead. The pump 98 may, of course, be of any suitable construction but is preferably of a rotary type. Drainage from the cylinders 13 and 14 is provided through a removable plug 102, Fig. 2, which screw-threadedly engages in a conical bore in the under side of the body 10 and has passageways 103 and 104 leading from the respective cylinders thereto. Steam collecting within the cavities within the rotors may condense to some extent when the engine becomes stationary but any moisture left therein will be converted into steam again upon further operation of the engine. It is to be noted further, Figs. 3 and 4, that the rotors are counterbalanced in respect to the vanes extending therefrom by means of the masses 104 and 105 of weight extending inwardly from the rotor peripheries on sides opposite the vanes.

In describing the operation of the engine, reference is first made to Fig. 3 wherein the rotors 18 and 30 are shown in those positions wherein the vanes 20 and 32 have traveled in the directions of the arrows from their contacting positions to bring the upper vane 20 past the opening 64 and the lower vane 32 thereunder. The small teeth 19 are in mesh and a closed initial clearance chamber is then defined between the vanes 20 and 32 and the intermeshing teeth 19. Rotation of the rotors is had through expansion of the steam against the vanes 28 and 33 of the other rotors to continue travel of the rotors 18 and 30 in the directions indicated and to rotate the valves 60 and 71 so as to uncover the port 63 by the opening 64 and permit admission of steam into this initial clearance volume of the two cylinders in which the rotors operate. Simultaneously the port 78 of the exhaust valve 77, turning counterclockwise, Fig. 3, begins to register with the exhaust opening 80, steam is admitted between the vanes 20 and 32 until the port 63 travels around beyond the intake opening 64 to close off the steam admission. Means may be introduced to vary the period of admission, such means being in addition to the valve structure shown and described and constituting a separate invention and, therefore, not herein shown and described.

As the vanes 20 and 32 revolve around, one away from the other from the opening 64, they travel in their respective cylinders to approach the exhaust opening 80 and, therefore, sweep out remaining steam from a previous operation through the opening 80, the valve port 78 and the valve 77 itself for discharge through the exhaust pipe 86. Following the closure of both intake and exhaust valves 60 and 77, the vanes 20 and 32 sweep on around one in immediate contact with the other through the positions as indicated in Fig. 5 and on to the positions shown in Fig. 3, immediately following which steam is again admitted for the next steam admittance.

The rotors 24 and 31, having their vanes 28 and 33 removed 180 degrees respectively from their interconnected rotors 18 and 30 receive steam thereagainst 180 degrees following admittance between the rotors 18 and 30, this admittance being controlled by the valve ports 65 and 79 located 180 degrees around their respective valves 60 and 77 from the ports 63 and 78.

Without in any way limiting the invention hereby but in order to permit visualization of the proportions of the engine in one particular size, for a conservative two horse power rating at 800 revolutions per minute, each cylinder is six inches in diameter and each rotor is formed on a five inch pitch diameter with a width of 1.750 inches to have seventy-six minor teeth 19; twenty pitch epicycloid tooth form. The vanes are given one-half pitch, stub tooth form. In the position of the rotors shown in Fig. 3, where the intake valve 60 is just on the point of opening, the center line of the vane 32 through the axis of the rotor is forty-six degrees above the horizontal center line through the cylinder 13 while the center line of the vane 20 through its axis is ten degrees below the horizontal center line of the cylinder 11.

The clearance volume at zero degrees intake port opening is 4.09 cubic inches. The openings of the ports in the intake valve are proportioned to have steam cut-off after 170 degrees of opening, the intake valve ports in the body 10 measure seventy degrees included angle from the valve axis while the ports in the intake valve itself measure one hundred degrees included angle from the center of the valve axis. The rotors travel between inlet and cut-off of the intake valve 160 degrees with a ten degree valve lead giving the total rotor rotation of 170 degrees before cut-off.

It is to be noted that the exhaust valve 77 closes its ports for the respective pairs of rotors prior to the passage of the vanes therepast. This means, as best illustrated in Fig. 4, that following the cut-off by the exhaust valve, there is a volume of steam or gases left to be compressed between the rotors as they continue on around to bring the vanes to those positions indicated in Fig. 5. This means that in the residual gas volume left within the cylinders following closure of the exhaust valve, a pressure is built up which tends to dissipate in part transversely between the upper and lower rotors between the teeth 19. However, steam pressure exists on the other side to as great or a greater degree so that the steam on the power side does not leak back in opposition to that pressure and that residual pressure may be dissipated by leakage in part down past the sides of the rotors and into the rotors to maintain the opposition pressure above indicated.

While the invention has been herein shown and described in the one particular form, it is obvious that structural variations may be employed without departing from the spirit of the invention and it is not intended that the invention be limited to that specific form beyond the limitations as may be imposed by the following claims.

The invention claimed is:

1. In a rotary engine, a body, a pair of peripherally intersecting cylinders formed in the body, a second pair of peripherally intersecting cylinders formed in the body coaxially aligned with the respective cylinders in the first pair, a partition in the body between said pairs having openings therethrough coaxial with the respective cylinders in each of said pairs, a rotor in each of said cylinders, said rotors being connected and secured one to the other in pairs through said partition openings, said rotors having chambers therein and having communication one with another through said rotor connections, each of said rotors having a major toothed peripheral portion of less diameter than that of its cylinder, a vane extending from each rotor into close, free running fit with the peripheral wall of its cylinder, each rotor having a depressed peripheral portion adjacent its vane, the axes of said cylinders being located to have the rotor in one cylinder in tooth meshing engagement with the rotor in the intersecting cylinder, said rotors being meshed to have the vane of one rotor follow in meshing engagement behind the vane of the other rotor to maintain a continuous tooth seal between the rotors, means for admitting fluid into the cylinders in timed sequence with travel of said vanes for movement thereof, said rotors being formed to have a close, free running side fit with the ends of their respective cylinders, and fluid passageways removed a distance from the rotor peripheries and carried through the rotor sides into said rotor chambers, whereby fluid escaping between the rotors and the cylinder ends may collect and build up pressure within the rotors to oppose further fluid flow thereto in the absence of packing.

2. In a rotary engine, a body, a pair of peripherally intersecting cylinders formed in the body, a second pair of peripherally intersecting cylinders formed in the body coaxially aligned with the respective cylinders in the first pair, a partition in the body between said pairs having openings therethrough coaxial wth the respective cylinders in each of said pairs, a rotor in each of said cylinders, said rotors being connected and secured one to the other in pairs through said partition openings, said rotors having chambers therein and having communication one with another through said rotor connections, each of said rotors having a major toothed peripheral portion of less diameter than that of its cylinder, a vane extending from each rotor into close, free running fit with the peripheral wall of its cylinder, each rotor having a depressed peripheral portion adjacent its vane, the axes of said cylinders being located to have the rotor in one cylinder in tooth meshing engagement with the rotor in the intersecting cylinder, said rotors being meshed to have the vane of one rotor follow in meshing engagement behind the vane of the other rotor to maintain a continuous tooth seal between the rotors, means for admitting fluid into the cylinders in timed sequence with travel of said vanes for movement thereof, said rotors being formed to have a close, free running side fit with the ends of their respective cylinders, and fluid passageways removed a distance from the rotor peripheries and carried through the rotor sides into said rotor chambers, whereby fluid escaping between the rotors and the cylinder ends may collect and build up pressure within the rotors to oppose further fluid flow thereto in the absence of packing, a fluid exhaust valve, and timing means closing off said valve before the vanes of intermeshed rotors come together to permit further travel of those vanes to build up a pressure within their cylinders against the intermeshing teeth ahead of the vanes.

3. In a rotary engine, a body, a pair of peripherally intersecting cylinders formed in the body, a second pair of peripherally intersecting cylinders formed in the body coaxially aligned with the respective cylinders in the first pair, a partition in the body between said pairs having openings therethrough coaxial with the respective cylinders in each of said pairs, a rotor in each of said cylinders, said rotors being connected and secured one to the other in pairs through said partition openings, said rotors having chambers therein and having communication one with another through said rotor connections, each of said rotors having a major toothed peripheral portion of less diameter than that of its cylinder, a vane extending from each rotor into close, free running fit with the peripheral wall of its cylinder, each rotor having a depressed peripheral portion adjacent its vane, the axes of said cylinders being located to have the rotor in one cylinder in tooth meshing engagement with the rotor in the intersecting cylinder, said rotors being meshed to have the vane of one rotor follow in meshing engagement behind the vane of the other rotor to maintain a continuous tooth seal between the rotors, means for admitting fluid into the cylinders in timed sequence with travel of said vanes for movement thereof, said rotors being formed to have a close, free running side fit with the ends of their respective cylinders, and fluid passageways removed a distance from the rotor peripheries and carried through the rotor sides into said rotor chambers, whereby fluid escaping between the rotors and the cylinder ends may collect and build up pressure within the rotors to oppose further fluid flow thereto in the absence of packing, side plates on said body forming end closures for said cylinders, bearings in said plates carrying each pair of connected rotors, and a pressure chamber outside of at least one plate initially receiving fluid leakage through said bearings to build up a residual pressure opposing further leakage.

4. In a rotary engine, a pair of circumferentially intersecting cylinders, a second pair of circumferentially intersecting cylinders, said cylinders being arranged to have a cylinder of each pair to one side of their intersections coaxially aligned and the other cylinders also being likewise coaxially aligned, a toothed driving rotor in each cylinder in mesh with the rotor in the intersecting cylinder, means securing in driving relation one rotor to the other between coaxial cylinders, a drive shaft having driving engagement with one rotor and extending axially through and beyond its connected rotor, a bearing supporting the shaft beyond said connected rotor, and bearings supporting each pair of the connected rotors independently of said shaft.

EARL E. BOWERS.
CHARLES M. TUMEY.